US011445244B1

(12) United States Patent
Jorgensen et al.

(10) Patent No.: US 11,445,244 B1
(45) Date of Patent: Sep. 13, 2022

(54) CONTEXT-AWARE QUESTION-ANSWER FOR INTERACTIVE MEDIA EXPERIENCES

(71) Applicant: TCL RESEARCH AMERICA INC., San Jose, CA (US)

(72) Inventors: Kyle Otto Jorgensen, San Jose, CA (US); Zhiqun Zhao, San Jose, CA (US); Haohong Wang, San Jose, CA (US); Mea Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 17/338,360

(22) Filed: Jun. 3, 2021

(51) Int. Cl.
| | |
|---|---|
| *H04N 21/44* | (2011.01) |
| *G06F 40/253* | (2020.01) |
| *G10L 15/26* | (2006.01) |
| *H04N 21/439* | (2011.01) |
| *H04N 21/84* | (2011.01) |
| *H04N 21/61* | (2011.01) |
| *G06F 40/30* | (2020.01) |
| *G06V 20/40* | (2022.01) |
| *H04N 21/643* | (2011.01) |

(52) U.S. Cl.
CPC ..... *H04N 21/44008* (2013.01); *G06F 40/253* (2020.01); *G06F 40/30* (2020.01); *G06V 20/41* (2022.01); *G10L 15/26* (2013.01); *H04N 21/439* (2013.01); *H04N 21/6125* (2013.01); *H04N 21/643* (2013.01); *H04N 21/84* (2013.01)

(58) Field of Classification Search
CPC ........... H04N 21/44008; H04N 21/439; H04N 21/6125; H04N 21/643; H04N 21/84; G06F 40/253; G06F 40/30; G06V 20/41; G10L 15/26
See application file for complete search history.

(56) References Cited

U.S. PATENT DOCUMENTS

| | | | | |
|---|---|---|---|---|
| 2016/0323646 | A1* | 11/2016 | Pratt | G06F 16/904 |
| 2020/0334290 | A1* | 10/2020 | Dontcheva | G06F 16/735 |
| 2021/0375267 | A1* | 12/2021 | Patil | G10L 15/07 |
| 2022/0058216 | A1* | 2/2022 | Yao | G06F 16/48 |

OTHER PUBLICATIONS

"IMDb: Ratings, Reviews, and Where to Watch the Best Movies & TV Shows", May 10, 2021. https://www.imdb.com/.
"Verb Tenses—How to Use Them Correctly | Grammarly",May 10, 2021.https://www.grammarly.com/blog/verb-tenses/.
Satanjeev Banerjee et al., "METEOR: An Automatic Metric for MT Evaluation with Improved Correlation with Human Judgments", ACL Anthology, 2005,Association for Computational Linguistics.

(Continued)

*Primary Examiner* — Nnenna N Ekpo
(74) *Attorney, Agent, or Firm* — Anova Law Group, PLLC

(57) ABSTRACT

A context-aware method for answering a question about a video includes: receiving the question about the video that is paused at a pausing position; obtaining and analyzing context information at the pausing position of the video, the context information including supplementary materials of the video; and automatically searching an answer to the question based on the context information at the pausing position of the video.

18 Claims, 7 Drawing Sheets

(56) References Cited

OTHER PUBLICATIONS

Castorini, "GitHub—castorini/pygaggle: a gaggle of deep neural architectures for text ranking and question answering, designed for Pyserini", May 10, 2021, https://github.com/castorini/pygaggle.
Danqi Chen et al., "Reading Wikipedia to Answer Open-Domain Questions", ACL 2017—55th Annual Meeting of the Association for Computational Linguistics, Proceedings of the Conference (Long Papers), Jan. 1, 2017, pp. 1870-1879, Association for Computational Linguistics (ACL).
Christopher Clark et al., "BoolQ: Exploring the Surprising Difficulty of Natural Yes/No. Questions", ACL Anthology, Jun. 2019, pp. 2924-2936, Association for Computational Linguistics.
Kevin Clark et al., "Electra: Pre-Training Text Encodersas Discriminators Rather Than Generators",ICLR 2020, Mar. 23, 2020.
Jacob Devlin et al., "BERT: Pre-training of Deep Bidirectional Transformers for Language Understanding", ACL Anthology, Jun. 2019, pp. 4171-4186, Association for Computational Linguistics.
Roman Grundkiewicz et al., "Near Human-Level Performance in Grammatical Error Correction with Hybrid Machine Translation", ACL Anthology, Jun. 2018, pp. 284 290, Association for Computational Linguistics.
Sami Iqram., "Now you can transcribe speech with Google Translate", Mar. 17, 2020, https://www.blog.google/products/translate/transcribe-speech/.
Daniel Khashabi et al., "UNIFIEDQA: Crossing Format Boundaries with a Single QA System", ACL Anthology, Nov. 2020, pp. 1896-1907, Association for Computational Linguistics.
Tomáš Kočiský et al., "The NarrativeQA Reading Comprehension Challenge", Transactions of the Association for Computational Linguistics (2018) 6: 317-328, 2018.
Zhenzhong Lan et al., "ALBERT: A Lite BERT for Self-Supervised Learning of Language Representations", CLR 2020, 2020.
Jie Lei et al., "TVQA: Localized, Compositional Video Question Answering", ACL Anthology, 2018, pp. 1369-1379, Association for Computational Linguistics.
Huayu Li et al., "A Context-aware A‡ention Network for Interactive Question Answering", Sep. 3, 2017.
Chin-Yew Lin, "ROUGE: A Package for Automatic Evaluation of Summaries", 2004, ACL Anthology, Association for Computational Linguistics.
Yinhan Liu et al., "RoBERTa: A Robustly Optimized BERT Pretraining Approach", Jul. 26, 2019.
Rodrigo Nogueira et al., "Document Ranking with a Pretrained Sequence-to-Sequence Model", Mar. 14, 2020, ACL Anthology, pp. 708-718, Association for Computational Linguistics.
Rodrigo Nogueira et al., "Multi-Stage Document Ranking with BERT", Oct. 31, 2019.
Kostiantyn Omelianchuk et al., "GECToR—Grammatical Error Correction: Tag, Not Rewrite", May 29, 2020.
Kishore Papineni et al., "BLEU: a Method for Automatic Evaluation of Machine Translation", Jul. 2002.
Peng Qi et al., "Stanza: A Python Natural Language Processing Toolkit for Many Human Languages", Apr. 23, 2020.
Pranav Rajpurkar et al., "Know What You Don't Know: Unanswerable Questions for SQuAD", 2018, ACL Anthology, pp. 784 789, Association for Computational Linguistics.
Pranav Rajpurkar et al., "SQuAD: 100,000+ Questions for Machine Comprehension of Text", Nov. 2016, ACL Anthology, pp. 2383-2392, Association for Computational Linguistics.
"The Mobile Internet Phenomena Report", Feb. 2020, Sandvine.
Victor SANH et al., "DistilBERT, a distilled version of BERT: smaller, faster, cheaper and lighter", Mar. 1, 2020.
Minjoon Seo et al., "Bi-Directional Attention Flow for Machine Comprehension", ICLR 2017, Jun. 21, 2018.
Mingyu Sun et al., "Discourse processing for context question answering based on linguistic knowledge", ScienceDriect, 2007.
Makarand Tapaswi et al., "MovieQA: Understanding Stories in Movies through Question-Answering", IEEE,2016.
Makarand Tapaswi et al., "MovieQA: Understanding Stories in Movies through Question-Answering", Computer Vision and Pattern Recognition, Sep. 21, 2016.
Hui Yang et al., "VideoQA: Question Answering on News Video", 2016 IEEE Conference on Computer Vision and Pattern Recognition (CVPR), 2016.
Zhilin Yang et al., "XLNet: Generalized Autoregressive Pretraining for Language Understanding",Advances in Neural Information Processing Systems 32 (NeurIPS 2019), Jan. 2, 2020.

* cited by examiner

100

S102 Receiving the question about the video that is paused at a pausing position S104 Obtaining and analyzing context information at the pausing position of the video S106 Automatically searching an answer to the question based on the context information at the pausing position of the video S108 Performing a language smoothing process on the answer to obtain a language smoothed answer S110 Outputting the language smoothed answer

FIG. 1

FIG. 2

CONTEXT-AWARE QUESTION-ANSWER FOR INTERACTIVE MEDIA EXPERIENCES

FIELD OF THE DISCLOSURE

The present disclosure relates to the field of machine reading comprehension technologies and, more particularly, relates to a method and device for context-aware question-answer for interactive media experiences.

BACKGROUND

Media content has become a primary source of information, entertainment, and even education. The ability to provide video content querying as well as interactive experiences is a new challenge. To this end, question answering (QA) systems such as Alexa and Google assistant have become quite established in consumer markets, but are limited to general information and lack context awareness. There is a need for an automatic context-aware QA system that provides answers to queries related to video content.

BRIEF SUMMARY OF THE DISCLOSURE

One aspect of the present disclosure provides a context-aware method for answering a question about a video. The method includes: receiving the question about the video that is paused at a pausing position; obtaining and analyzing context information at the pausing position of the video, the context information including supplementary materials of the video; and automatically searching an answer to the question based on the context information at the pausing position of the video.

Another aspect of the present disclosure provides a context-aware device for answer a question about a video. The device includes a memory storing program instructions and a processor coupled with the memory. The processor is configured to execute the program instructions to: receive the question about the video that is paused at a pausing position; obtain and analyze context information at the pausing position of the video, the context information including supplementary materials of the video; and automatically search an answer to the question based on the context information at the pausing position of the video.

Another aspect of the present disclosure provides a context-aware system for answering a question about a video. The system includes a terminal device and a cloud server. The terminal device is configured to: receive the question about the video that is paused at a pausing position; send the question to a cloud server; receive a language smoothed answer from the cloud server; and output the answer. The cloud server is configured to receive the question from the terminal device; obtain and analyze context information at the pausing position of the video, the context information including supplementary materials of the video; automatically search the answer to the question based on the context information at the pausing position of the video; perform a language smoothing process on the answer to obtain a language smoothed answer; and send the language smoothed answer to the terminal device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1 illustrates a flowchart of an exemplary context-aware method for answering a question about a video according to some embodiments of the present disclosure;

FIG. 2 illustrates a sample scene and associated metadata according to some embodiments of the present disclosure;

DETAILED DESCRIPTION

Figure 3:
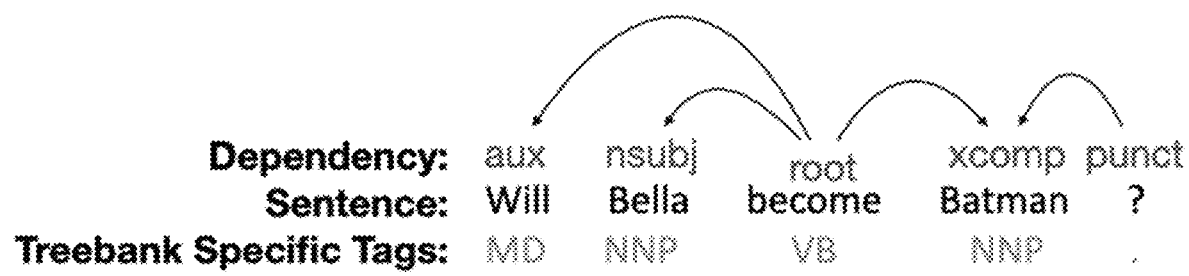
FIG. 3 illustrates a schematic diagram of exemplary dependency relations according to some embodiments of the present disclosure.

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Video streaming alone consists of more than 57% of the global Internet traffic. Medium content is embedded in many other applications such as social networking, gaming, and messaging. Media contents have become people's primary source of information, entertainment, and education. As the amount of media contents continues to grow rapidly, so does the demand for video content querying and interactive experiences that facilitate users to access the media contents conveniently. Even a television, once a passive device, allows interactions via a mobile device. The trend from passive to interactive opens up numerous opportunities for new forms of the media contents.

For example, a user may pause a video the user is watching and ask a question about the video. The question asked by the user may be processed by natural language processing models. For example, bidirectional encoding representations for transformers (BERT) models are often used to process the user's question and achieve good accuracy. Other deep learning models may also be used to achieve similar accuracy. Amazon Alexa and Google assistant are examples of question answering (QA) systems based on these models. The QA systems are capable of human-machine conversation and are widely adopted in consumer markets. While good at general information question-answering, these QA systems have not delved significantly into more context-aware conversation. Moreover, the computational complexity of the QA model is another challenge for deployment, with QA models for information-rich video content being even more resource intensive.

The present disclosure provides a method and a device for a light-weight context-aware QA to improve QA experience on multimedia contents. The light-weight context-aware QA is also called Context-QA for short. The context awareness is achieved through a Staged QA controller algorithm that keeps the search for answers in the context most relevant to the question. Evaluation results show that the method improves the quality of the answers by up to 52% and uses up to 56% less time compared to a conventional QA model. Subjective tests show the method outperforms the conventional QA model by 38% and achieves 90% positive responses.

The present disclosure provides a context-aware method for answering a question about a video. The method is also called Context-QA. The Context-QA is a light-weight context-aware QA framework, providing QA on multimedia content. The user may ask a device or a system running Context-QA questions about the video in real-time. Context-QA provides context-aware processing by utilizing supplementary materials, such as film literature, summaries, screenplays, and closed captions of the video, controlling the flow of the supplementary materials as they are utilized to generate an answer. After the answer is obtained, the answer is smoothed for a more natural and human-like interactive experience. Context-QA achieves its light-weight objective by offloading all QA processing and tasks to the cloud.

In the present disclosure, the QA system includes a web interface built on top of a video player, which can be deployed on any modern web devices. The Context-QA function is activated whenever the user pauses the video to ask questions. The QA system provides answers in near real-time, where the answer to the same question may be different depending on where in the video the user paused. Evaluation results show that Context-QA improves the quality of the answers by up to 52% and uses up to 56% less time compared to a baseline conventional non-context-aware QA model. Subjective tests show Context-QA outperforms the baseline QA model by 38%, with 90% of the users reporting enjoying Context-QA. Furthermore, the use of an HTTP API and cloud computing make Context-QA adaptable by any system, including mobile devices.

The embodiments of the present disclosure are developed based on tools in natural language processing (NLP), such as machine reading comprehension, grammatical error correction (GEC), document ranking techniques, and context analysis. The context analysis explores the role context plays on a film. For example, the relation between successive questions that a user may ask was explored (i.e., Who is he? What is he doing here? both are questions about the same person if asked in a successive manner). In another example, when a user asks a question while watching a film, they likely want to know more about the particular place they are at. If they ask where a character is, they likely wouldn't care to receive the answer of where the character was five scenes ago.

FIG. 1 illustrates a flowchart of an exemplary context-aware method for answering a question about a video according to some embodiments of the present disclosure. The method is also called Context-QA in the specification and is intended to achieve objectives of context awareness and light weight processing. As shown in FIG. 1, the method includes the following process.

At S102, the question about the video that is paused at a pausing position is received.

Context-QA includes a context analyzer (CA), a QA module, and a language smoother (LS). The CA pre-processes the question to identify a tense of the question, which not only narrows a search domain for a QA model, but also focuses on most relevant context. The LS post-processes the answer for a more natural and human-like interactive experience. In between the CA and the LS, the QA module performs a deep learning driven analysis of the context provided by the CA to generate the answer that is passed to the LS to smooth out. The QA module drives a QA model based on the tense of the question to perform a context-aware search to determine the answer matching the question. The QA model is a wrapper that can wrap any existing or future QA model with interfaces for the CA and the LS. In some embodiments, the Context-QA interface may work entirely through the HTTP API, which makes it simple and flexible to integrate into existing video players, while handling all processing and QA tasks in the cloud, allowing for light-weight processing.

Context-QA provides context-aware QA experience for video using supplementary materials regularly available for films. The supplementary materials include general descriptions of characters, timestamps of scenes, scene summaries, scene screenplays, and closed captioning. For example, metadata for a scene is shown in FIG. 2. The supplementary materials shown in FIG. 2 are readily available. In some embodiments, the supplementary materials may be obtained in the following ways. Character descriptions are often available from film databases, such as IMDb. Timestamps of scenes can be automated in a process that could cross-reference the closed captioning of the video with the screenplay. As a result of this process, the scenes of the screenplay can also be separated. If no closed captioning material is available, audio tracks can be transcribed automatically using transcription software or platforms such as Google's live transcribe feature. In addition, the scene details in the screenplay may be used directly. The characters present in each scene can also be obtained by scraping the screenplay.

For illustration purpose, a short film is used as a running example to describe Context-QA. When the user pauses the video, the user may ask questions and receive answers in real-time. Playing the video again resumes as normal. The short film's premise is of a young girl named "Ella", who, against the wishes of her aunt, finds and uses a magic copy of Grimm's Fairy Tales to enter and rewrite their stories. These changes create unexpected outcomes, with the fairy tales throughout the world changing and giving children nightmares. To fix the stories, Ella has to brave a journey to find Grimm and rewrite the tales so that the world can once again enjoy them. The sample question is "Will Bella become Batman?" This question was chosen because the answer requires a search in almost all supplementary materials, allowing for a better demonstration of the Context-QA system in action.

At S104, context information at the pausing position of the video is obtained and analyzed.

The CA is activated when the user pauses the video to ask the question. The CA pre-processes each question to determine the tense of the question, which helps to determine the time range the QA module focuses on. For this to occur, the question must undergo an analysis of its verbs. This involves creating a dependency parse tree, and taking the tense of the root and its dependents within a sentence. In this case, only verbs are examined. Other labels, such as nominal subjects (nsubj), punctuation (punct), and open clausal components (xcomp) are ignored because they do not carry the tense information. The process is accomplished with the use of Stanza's dependency parsing and parts-of-speech tools using the Penn Treebank Parts-Of-Speech (POS) tagging style.

For example, parsing for the sentence "Will Bella become Batman?" is shown in FIG. 3. In this case, the root of the sentence is become, with a POS tag of VB, meaning verb, base form. To determine the tense of the question, related tags are also checked. In this case, auxiliary (aux) verbs are also checked. As shown in FIG. 3, Will is an aux verb of the root with a POS tag of MD, meaning model. Because the word is not followed by have, the tense of the question is determined to be a future tense.

In some embodiments, determining the tense of the question involves a variety of cases that must be handled. If the root has a label of Verb past tense (VBD), it can be concluded as past tense immediately. For all other labels, the aux verbs related to the root word must be examined. If the aux verb has a label of MD (model), it can be considered the future tense unless followed by the aux verb have, in which case it becomes a past tense. If the aux verb is a non-$3^{rd}$ person singular present verb or a $3^{rd}$ person singular present verb, it may be considered a present tense. For all other cases, the question can be considered the present tense. In some other embodiments, exceptions to the foregoing rules may be added.

At S106, an answer to the question is automatically searched based on the context information at the pausing position of the video.

The QA module is a wrapper of the QA model. A plurality of QA models are available for searching the answer to the question. In one embodiment, the QA model adopts machine reading comprehension technologies and can deal with a multitude of different question types, including the above extractive, multiple choice, abstractive, and yes or no type questions. In this way, abilities to answer questions are not limited, and so that it is not needed to have several different models running concurrently. In one embodiment, the QA model is UnifiedQA model for its robust capabilities to handle a variety of questions with any further training or fining-tuning. The QA module is kept simple, expecting only a selected passage (e.g., a passage from a summary of scenes, scene screenplay) and the question to be sent through the HTTP API. Likewise, the QA module outputs only the answer. This allows the ability to simply drop in any existing QA model with very little configuration, and eliminates any concerns about how the other components in Context-QA function.

At S108, a language smoothing process is performed on the answer to obtain a language smoothed answer.

While the QA model often focuses on extracting or piercing together the answer, the answer may or may not be understandable by users. For example, the answer provided by the QA model to the question "What does Aunt Mary do for a living?" is "she works as a teacher and collect rare items" which suffers from an error caused by bad film source material, and should be fixed to read "she works as a teacher and collects rare items." The LS post-processes the answer to deliver a more natural and human-like interactive experience. When an unpolished answer is received from the staged QA controller, the LS is activated.

When the LS obtains the answer, it is sent through a grammar error correction (GEC) model that improves the output of the answer. In one embodiment, an optimized pre-trained model GeCtor is used for NLP systems. The GeCtor model is adopted for its speed. This step conditions the answer for smoother presentation and leads to an improvement in the answers provided by the QA model. For example, the answer "she works as a teacher and collect rare items" passes through the LS to obtain the language smoothed answer "she is a teacher and collects rare items." In addition, the GEC model can be applied to correct grammatical mistakes that may have been made in either the source material or from the question answering process itself.

The CA, the QA, and the LS modules work together to provide a context-aware QA experience. The Context-QA system further includes a staged QA controller to control how information is passed through the three modules in searching for the matched answer. First, Context-QA generates the metadata to organize and index the original video and supplementary materials. The scenes in the video are indexed by timestamps (i.e., the starting time and the ending time of each scene.) There are three levels of information associated with each scene. The first level (L1) includes the summary of the scene. The second level (L2) includes the screenplay of the scene. The third level (L3) includes the closed caption or audio track of the scene. The information is arranged from comprehensive (L1) to details (L3). The number of levels may vary from video to video depending on the supplementary material available. The general description of each character is indexed by the character name.

The supplementary materials include a plurality of passages. The stage QA controller uses a document ranker to evaluate the relevancy of the supplementary materials with the question of interest. In one embodiment, the document ranker is PyGaggle, which is effective at ranking documents in both score and speed. The open-source PyGaggle software adopts a Text-to-Text Transfer Transformer (T5) type model, which is fine-tuned on documents according to a true or false tag with a softmax on the logits of the True or False designations. This document ranker can handle both the segmenting and ranking of the documents without any further need to worry about token limitations in traditional question answering models. The document ranker is used to examine the probability that the plurality of passages are related to the question. The relevancy of a passage to the question is called a passage score. The passage score is given as the log of a softmax. As such, the passage score is a negative floating-point number. The closer the passage score to 0, the better the predicted match.

Figure 4:
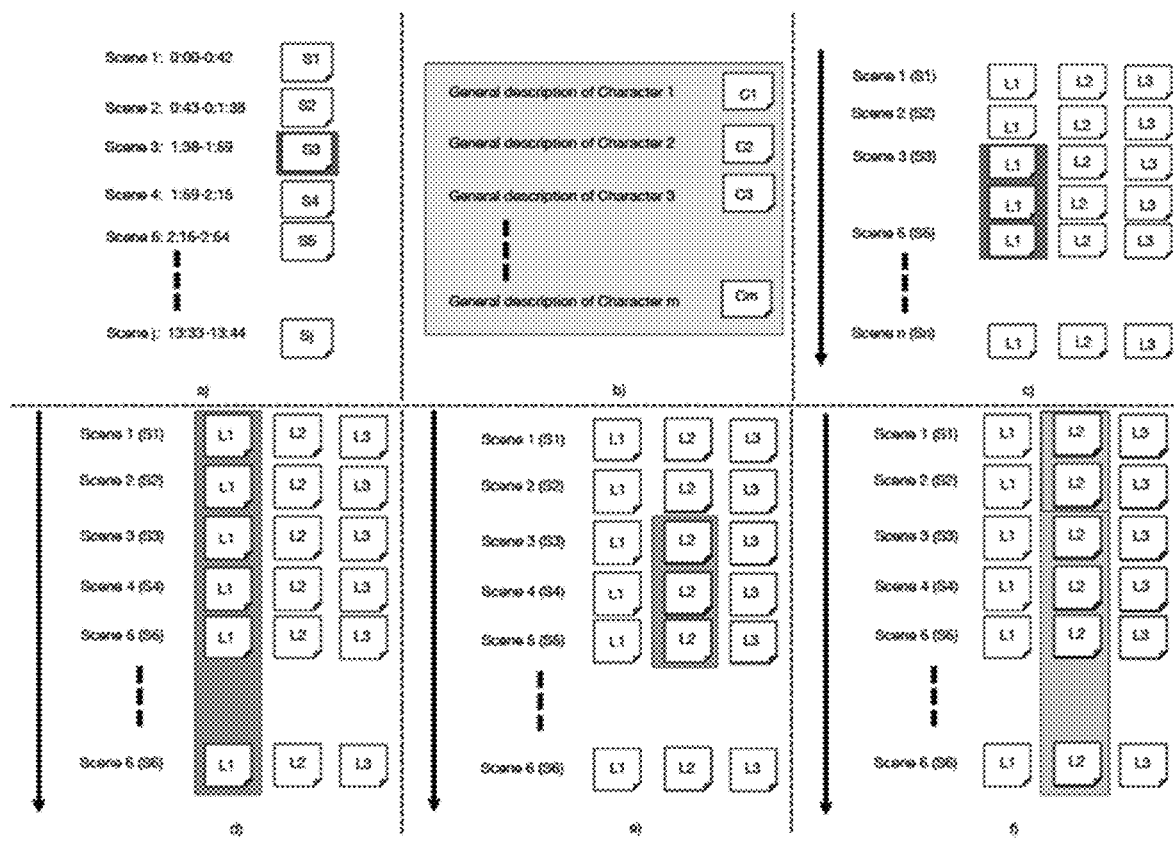
FIG. 4 illustrates a schematic diagram of phases of an exemplary staged QA controller algorithm according to some embodiments of the present disclosure.

Next, Context-QA enters a three-phase QA process as soon as the question is received. The process is designed to mimic how human would search for answers in a video, a novel, or a play. In some embodiments, searching the answer to the question based on the context information at the pausing position of the video may include: searching the plurality of passages to find a passage matching the question based on the passage score; in response to finding a passage matching the question, generating the answer based on the passage matching the question; and in response to no passage matching the question being found, generating the answer to be a notification that no answer is found. The process begins with a location search in phase 1, as shown in FIG. 4(a). In phase 2, a character search is performed, as shown in FIG. 4(b). In phase 3, an iterative search among all supplementary materials is performed, as shown in FIGS.

4(c)-4(f). The search for the matching passage terminates as soon as the passage score of a searched passage from the QA module is greater than a predefined threshold, regardless of which phase the search is in.

Further, a passage is determined to match the question when the passage score is greater than or equal to a preset threshold corresponding to a current search, the current search being one of the location search, the character search, and the iterative search; and a passage is determined not to match the question when the passage score is smaller than the preset threshold corresponding to the current search. In some embodiments, the preset threshold for the location search and the character search is higher than the preset threshold for the iterative search.

For example, Phase 1 (e.g., location search) search uses the timestamps of the video, received when the question is asked, to pull the scene, which includes locations of characters. This is used to catch questions like "Where is Ella?" and provide location context information. The sample threshold in phase 1 is set to a lower range between −0.3 and −0.1 in order to ensure only questions about where a character is are matched. If the threshold is too loose, other questions unrelated to location will often find the location information labelled as matches. In the sample question "Will Bella become Batman?" the best passage found in this phase is "Bella is in her bedroom at home" with a passage score of −6.96, which is less than the sample threshold value of −0.3.

Phase 2 (e.g., character search) search looks up the general description of the characters in the video. This is used to catch questions like "Who is Ella?" and "What does Aunt Mary do for a living?" and provide character context information. For the same reason as in Phase 1, the sample threshold for Phase 2 is set to −0.3. In one embodiment, the sample question is "Will Bella become Batman?" The best passage found in this phase is "Bella is a girl at school and is one of Ella's best friends" with a passage score of −8.99, again much less than the sample threshold value of −0.3.

Phase 3 (e.g., iterative search) iteratively searches for the matching passage in scenes highly relevant to the question. The search starts from the current scene where the video is paused and the question is asked. For example, as shown in FIG. 2, the question was asked at 0:03. The CA module determines the question that the question is in the future tense. Thus, only current and future scenes are at first deemed relevant to the question. In general, the tense of the question determines the scenes or a scene base that should be searched first. For past tense questions, the scene base includes the current scene and the previous N−1 scenes. For present tense question, the scene base includes the current scene. For future tense questions, the scene base includes the current scene and the next N−1 scenes. N is an integer greater than 1 and is the size of the scene base. In one embodiment, N is 3.

The iterative search scans the scenes in two directions: scene-span and detail-span. The scan begins at the comprehensive level of the supplementary materials of the scene base. The sample threshold for the iterative search is relaxed from the previous two phases because passages matching to general answers are the focus in this phase. In the previous two phases, the search focuses on location-based questions and character-based questions. In one embodiment, for the sample question, the matching passage found based on the summary (L1 supplementary materials) of the scene base (i.e., the current scene and the next two scenes, as shown in FIG. 4(c)) is "On the way to look for Grimm, Ella loses her way, the night comes, Ella feels incredibly scared. She starts to tremble and tries to go back." With a passage score of −13.02, much less than the sample threshold value −2.0. The next iteration expands in time to scan summary data of all scenes, as shown in FIG. 4(d). For detail-span searches, it is found that an even looser threshold helped to find a correct passage, with a threshold range between −10.0 and −8.0. The search finds that the passage "Ella feels afraid and avoids facing her mistakes. Aunt finds Ella, tries to persuade . . . " (complete passage not shown for brevity) is the matching passage with the passage score of −12.61, much less than the threshold value of −10.0.

Next, the search goes into details, that is, moving to L2 supplementary materials, and focusing on the scene base first and then all scenes, as shown in FIGS. 4(e)-4(f). At the end of the L2 iterations, the matching passage score is −8.20, which I snow greater than the threshold value −10 for this phase of search. The passage includes the screenplay elements of Bella talking with Ella and the rest of her friends, and is the most relevant passage about Bella that would be found if a person manually examines the documents. When the passage is sent to the QA model, the answer of "no" is found, likely because Batman or other related words are mentioned in the passage. The answer is passed to the LS module for smoother and more natural presentation to the user. If the passage score is still less than the threshold value, the stage QA controller continues the search in the L3 supplementary materials. This is the last chance to find the matching passage. The passage score for the matching passage is reduced further, for example −10.5, which gives answers from the scene-span searches. If no match is found, Context-QA may return a message notifying the user that no answer is found.

At S110, the language smoothed answer is outputted.

Specifically, the language smoothed answer may be displayed on the terminal device to the user or may be played in an audio form by the terminal device to the user.

The stage QA controller prioritizes examining the summary data over detailed data with focus on the scene base to reduce the search time. For light-weight processing, Context-QA is designed to run entirely from the HTTP API. The API is designed in a modular way that allows the easy replacement of components as more desirable QA models become available. Inside Context-QA, the components communicate by API calls, which gives the framework the ability to scale to demand, where multiple access points for each API call could be created and load-balanced. Data for films, such as the summaries and screenplays, are stored in the CA component, avoiding the unnecessary transfer of data across the API.

In the cloud, the staged QA controller prioritizes the search in phases, reducing the likelihood that the answer is found after all documents are searched. Context-QA not only provides the context-aware answer to the question, but also avoids the need to scan all documents to find the matching passage. This time-saving strategy helps to reduce the load on the cloud computers, leading to a light-weight system. The cloud-based design and HTTP API interface make Context-QA not only suitable for mobile devices, but also adaptable by any system.

Evaluation of Context-QA is described below. The front-end of Context-QA is implemented using a modified video player to receive the question asked by the user when the video is paused, which works as a web app on any modern web browser. When the user asks the question, the question is sent to the back-end for processing. The back-end implements all the forgoing modules and the staged QA controller, and runs on a Ryzen 5 2600 computer with 64 GB of RAM and a solid state drive (without the use of any GPU). The communication between the front-end and the back-end is through the HTTP API.

When evaluating Context-QA, 35 films are used. A set of questions are defined for each film. Some questions are repeated at different times. The difficulty level of the questions is rated using a 3-point system. Difficulty level 1 questions need only the phase 1 search. Difficulty level 2 questions need the phase 2 search. Difficulty level 3 questions need the phase 3 search. The answers are scored from 0 to 1, where 0 means incorrect, 0.5 indicates the answer is correct but not in the given context, 0.75 indicates the answer is correct, but not grammatically pleasing, and 1 means that the answer is correct and grammatically pleasing. The ground-truth answers are manually prepared to evaluate the answers provided by Context-QA.

Sample questions for the running example film "Ella" are listed in Table 1 below, along with timestamps, difficulty levels, answers by Context-QA and Unified QA (without the context awareness and language smoother, but still using PyGaggle to select the best overall passage), and scores of the answers. The prototype of Conext-QA based on the film "Ella" is available at http://Context-QA.xyz.

TABLE 1

| Time-stamp (mm:ss) | Question | Difficulty | Ground Truth | Context-QA | Score | Unified QA | Score |
|---|---|---|---|---|---|---|---|
| 0:14 | Who is Aunt Mary? | 2 | A teacher or Ella's aunt | Ella's aunt. | 1.2 | a teacher who lives with Ella. | 1.0 |
| 0:14 | What does Aunt Mary do for a living? | 2 | She works as a teacher and collects rare items. | She works as a teacher and collects rare items. | 1.2 | she is a teacher and collects rare items. | 1.0 |
| 11:38 | Who is Aunt Mary? | 2 | A teacher or Ella's aunt | Ella's aunt. | 1.2 | a teacher who lives with Ella. | 1.0 |
| 11:38 | What does Aunt Mary do for a living? | 2 | She works as a teacher, and is a collector of rare items. | She works as a teacher and collects rare items. | 1.2 | she is a teacher and collects rare items. | 1.0 |
| 2:14 | What kind of book does Ella have? | 3 | a magic book | A magic book. | 1.2 | a magic book | 1.0 |
| 2:14 | What kind of book is Ella holding? | 3 | a magic book | A magic book. | 1.2 | a magic book. | 1.0 |
| 0:22 | Where is Ella? | 1 | In her bedroom | In her bedroom. | 1.2 | living with her aunt who has a private library. | 0.5 |
| 4:24 | Where is Ella? | 1 | School Cafeteria | In her school's cafeteria. | 1.2 | living with her aunt who has a private library. | 0.5 |
| 11:27 | Where is Ella? | 1 | Inside Grimm's house | Inside Grimm's house. | 1.2 | living with her aunt who has a private library. | 0.5 |
| 0:34 | What did Ella take? | 3 | Nothing | The book. | 0.5 | the magical book | 0.5 |
| 0:34 | What will Ella take? | 3 | The book or poisonous apple | The poisonous apple from the queen's room. | 1.2 | the poisonous apple | 1.0 |
| 1:57 | What did Ella take? | 3 | The book | The book. | 1.2 | the magical book | 1.0 |
| 1:57 | What will Ella take? | 3 | the poisonous apple | The poisonous apple from the queen's room. | 1.2 | the poisonous apple | 1.0 |
| 7:02 | What did Ella take? | 3 | the poisonous apple | The Poisonous apple. | 1.0 | the magical book | 0.5 |
| 7:02 | What will Ella take? | 3 | the magic pen | The poisonous apple from the queen's room. | 0.5 | the poisonous apple | 0.5 |
| 11:31 | What did Ella take? | 3 | The book or poisonous apple | The book. | 1.2 | the magical book | 0.5 |
| 11:31 | What will Ella take? | 3 | a magic pen | A magic pen. | 1.2 | the poisonous apple | 0.5 |
| 2:06 | Does Ella know where Grimm is? | 3 | No | No. | 1.2 | no | 1.0 |
| 8:47 | Does Ella know where Grimm is? | 3 | No | No. | 1.2 | no | 1.0 |
| 12:24 | Does Ella know where Grimm is? | 1 | Yes | Yes. | 1.2 | no | 1.0 |
| 1:55 | Has Aunt Mary found out Ella read the book? | 2 | No | No. | 1.2 | no | 1.0 |

TABLE 1-continued

| Timestamp (mm:ss) | Question | Difficulty | Ground Truth | Context-QA | Score | Unified QA | Score |
|---|---|---|---|---|---|---|---|
| 1:55 | Will Aunt Mary find out Ella read the book? | 2 | Yes | No. | 0.5 | aunt mary will find out Ella read the book. | 1.0 |
| 8:46 | Has Aunt Mary found out Ella read the book? | 1 | Yes | Yes. | 1.2 | No | 0.5 |
| 8:46 | Will Aunt Mary find out Ella read the book? | 1 | Yes or she already has | Aunt Mar will find out Ella is reading the book. | 1.0 | aunt mary will find out Ella read the book. | 1.0 |
| 1:10 | Where is Grimm? | 3 | On an adventure | On an adventure. | 1.2 | on an adventure. | 1.0 |
| 1:10 | Does Ella know where Grimm is? | 3 | No | No. | 1.2 | No | 1.0 |
| 11:56 | Where is Grimm? | 3 | On an adventure | On an adventure. | 1.2 | on an adventure. | 1.0 |
| 11:56 | Does Ella know where Grimm is? | 1 | Yes | Yes. | 1.2 | No | 1.0 |
| 2:43 | What did Ella do to the fairy tales? | 3 | She entered them. | Enter and exit the fairy tale land. | 1.0 | rewrite them | 0.5 |
| 13:33 | What did Ella do to the fairy tales? | 3 | Rewrote them | Rewrite them. | 1.0 | rewrite them | 1.0 |
| 2:42 | Is Ella lost? | 1 | no | No. | 1.2 | yes | 0.5 |
| 10:11 | Is Ella lost? | 1 | yes | Yes. | 1.2 | yes | 1.0 |
| 1:38 | Is Ella looking for Grimm's house? | 1 | no | No. | 1.2 | yes | 1.0 |
| 9:47 | Is Ella looking for Grimm's house? | 1 | yes | Yes. | 1.2 | yes | 1.0 |
| 10:39 | Is Ella looking for Grimm's house? | 1 | no | No. | 1.2 | yes | 1.0 |
| 2:38 | Will Bella become Batman? | 3 | no | No. | 1.2 | No | 1.0 |
| 9:35 | Who is Bob? | 3 | doesn't exist/ unknown | I am sorry, but I do not know the answer. | 1.2 | an old man who lives at Grimm's house. He might be a house care | 0.0 |
| 7:59 | How many items does Ella use? | 3 | 3 | 3. | 1.2 | two | 0.0 |

The goal of any question-answer system focuses on the answer outputs, the LS module of Context-QA is examined first. To quantify the improvement, NarrativeQA dataset is used to test the ability of a model on information integration and reasoning. The dataset consists of a set of questions, a given context for each question, and a set of gold standard answers. The dataset is fed to three well-known QA models, namely BiDAF, BERT, and UnifiedQA to produce answers. In order to focus on the LS module, Context-QA is modified to disable the CA module and the staged QA controller so that Context-QA is essentially just using the LS GeCtor model to smooth the answers by UnifiedQA. The answers for the QA systems are evaluated using four metrics: BLEU-1, BLEU-4, METEOR, and Rouge-L, which are different statistical measures of the answers against the gold standard answer.

The comparisons are presented in Table 2 below. Among the three baseline QA models, the BERT model scores the best in BLEU-1. UnifiedQA scores the best in Rouge-L. The BERT model achieves the best BLEU-1 score likely because it most closely answers the question by copying the words from the original context, for which BLEU-1 rewards the most and penalizes differences. The LS module in Context-QA changes extracted text and as such, makes Context-QA lose out on the score here. The LS module in Context-QA improved upon the naïve UnifiedQA model in BLEU-1, BLEU-4, and METEOR scores while decreasing by only 0.1 on Rouge-L scores. Overall, Context-QA closely matches the best of the two, with just the addition of the LS module. This demonstrates, from a purely quantitative point of view, that improvements from the LS module are observed with much more human appearing text in the answers.

TABLE 2

| Method | BLEU-1 | BLEU-4 | METEOR | Rouge-L |
|---|---|---|---|---|
| BiDAF | 36.74 | 33.45 | 15.69 | 15.68 |
| BERT | 44.89 | 41.52 | 18.59 | 24.90 |
| UnifiedQA | 40.77 | 41.36 | 18.38 | 26.20 |
| Context-QA | 42.11 | 42.69 | 19.06 | 26.10 |

Figure 5:
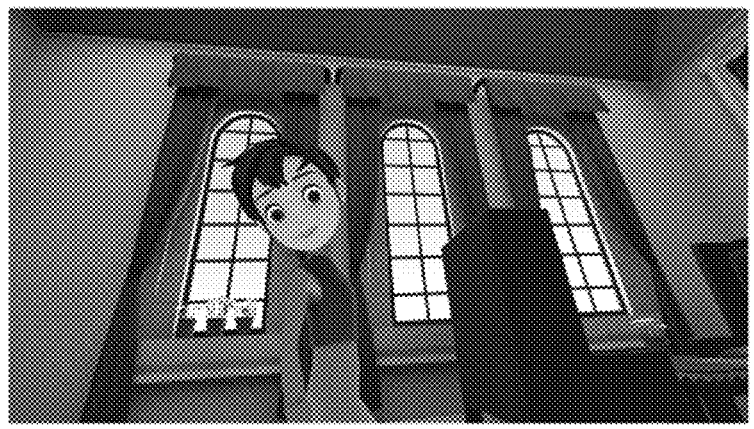
FIG. 5 illustrates a comparison of answers from Context-QA and UnifiedQA according to some embodiments of the present disclosure.

Next, the context analysis is evaluated. The scores of the answers by Context-QA and UnifiedQA are compared. In this case, the predefined threshold is set to −0.3 for phase 1 and phase 2, −2.0 for the scene-span in phase 3, and −10.0 for the detail-span in phase 3. The size of the scene base is set to 3. The average score for each difficulty level us summarized in Table 3 below. Context-QA scores 50% higher for difficulty levels 1 an d3, and 22% higher for difficulty level 2. Because Context-QA uses the UnifiedQA model in its QA module, the improvement is contributed by the CA module, the LS module, and the staged QA controller. The reason that the improvement for the questions with difficulty level 2 is less is that the general description of characters are mostly independent of context. Thus, both Context-QA and UnifiedQA produce the same answer for the questions that are directly related to the general description of characters. FIG. 5 shows some of the typical differences observed in tests between Context-QA and UnifiedQA.

TABLE 3

| Difficulty Level | Quality Improvement | Time Reduction |
| --- | --- | --- |
| 1 | 51% | 57% |
| 2 | 22% | 50% |
| 3 | 52% | 47% |

Figure 6:
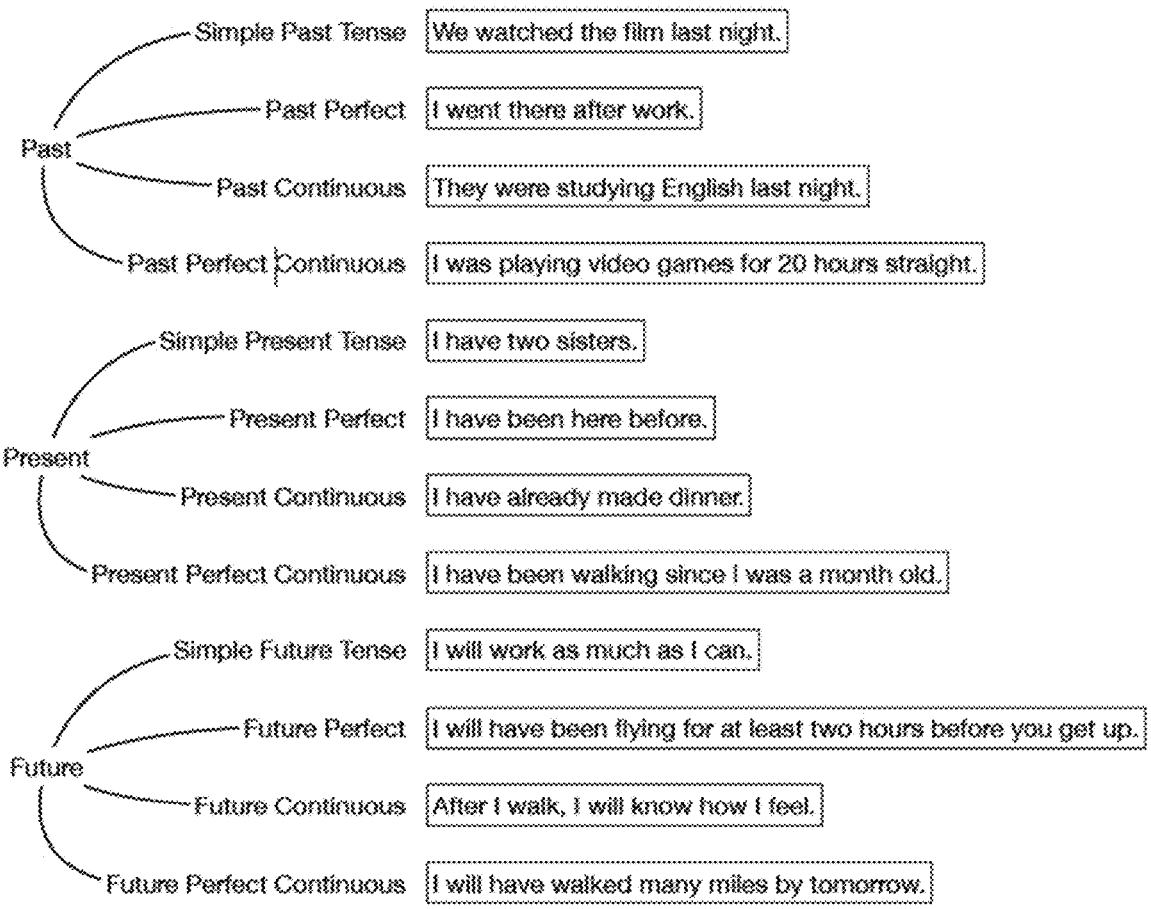
FIG. 6 illustrates sample questions from a pool of all tenses according to some embodiments of the present disclosure.

To verify the correctness of the CA module in determining the tense of the question, a list of over 100 sentences including 43 past tense sentences, 55 present tense sentences, and 45 future tense sentences with various structures are used. Each tense includes four different structures: simple, continuous, perfect, and perfect continuous. Each of these categories of the questions is represented in the test set. Examples of each category are shown in FIG. 6.

The CA module is able to correctly identify the tense of all 143 sentences, which verifies the tense determination function of the CA module. When exceptions occur, the structure of the CA module may be easily changed to capture new cases, while still having a good level of certainty that the changes do not impact any existing functions.

Context-QA offloads the search for the answer to the cloud to keep the mobile front-end light weight. The time taken by Context-QA and UnifiedQA to produce the answer is compared. The average time reduction for each difficulty level is summarized in Table 3 above. Context-QA is 57%, 50%, and 47% faster than UnifiedQA for difficulty level 1, 2, and 3, respectively. This is attributed to the staged QA controller on guiding the process to focus on the most relevant content. Context-QA is able to answer 15% of the questions in less than 1 second, 29% of the questions in just over 1 second, 25% of the questions in just over 2 seconds, and 11% of the questions in more than 3 seconds. Though it still takes more than 1 second to produce the answer for most questions, the significant time improvement over UnifiedQA confirms that the stage QA controller is achieving near real-time interaction.

The difference in response time is related to how long the CA module searches on a wrapper system and how common words are in the passages in a non-wrapper system. For the question "Will Bella become Batman?", the fact that Bella is a minor character with very little content in the supplementary materials makes UnifiedQA and Context-QA take longer than usual in searching. Context-QA carries on the search until last stages. For the questions "Who is Bob?" and "Will Bella become Batman?", it takes UnifiedQA about a same amount of time (>6 second) while Context-QA answers the first question significantly faster (0.47 second). In this case, Context-QA find that no passage ranked high enough, and as such, the UnifiedQA model is bypassed, which is quite a gain in performance.

In some embodiments, Context-QA includes two tunable parameters: the threshold for the passage score and the size of the scene base. The setting of these two parameters varies from video to video. The running example film "Ella" illustrates the impacts of these two parameters. In some embodiments, the threshold is −0.3 for phase 1 and phase 2 and is between −10.5 and −2.0 for phase 3.

Figure 7:
FIG. 7 illustrates exemplary thresholds in phase 1 and phase 2 tuning according to some embodiments of the present disclosure.

In some embodiments, the threshold is set to a range between −2.0 and −0.2 for the selected test question with difficulty levels 1 and 2. Correct answers are obtained for all questions with the threshold value −0.3 or more. For example, as shown in FIG. 7, the answer "Ella's aunt" is better given that the context of the question is about how Aunt Mary related to Ella. By tightening the threshold, better context awareness is achieved for the easy questions.

Figure 8:
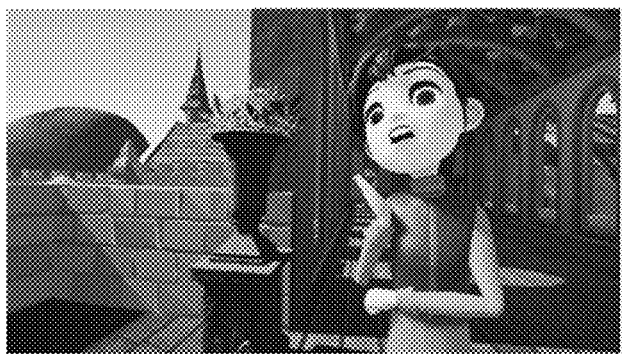
FIG. 8 illustrates exemplary thresholds in phase 3 tuning according to some embodiments of the present disclosure.

For the difficult question at level 3, the matching passage for the answer may or may not be found. The answer may be found in scenes far away from the current scene or by diving into more details of each scene. Thus, the thresholds for the scene-span and the detail-span may be set differently. For the scene-span, the passage scores of the best passages selected by the document ranker PyGaggle for the difficult questions at level 3 that require the detail-span searches are between −1.138 and −0.00402. In one embodiment, the threshold is set to −2.0 for the scene-span searches. It is observed that the thresholds of −2.0 or higher offers the correct answers when tuning the threshold between −10.0 and −0.1, as shown in FIG. 8. For the detail-span, the passage scores of the best passages selected by the document ranker PyGaggle for the difficult questions at level 3 are between −5.794 and −0.00391. In one embodiment, the threshold is set to −10.0 for the detail-span searches. For completely irrelevant questions such as "Who is Bob?" the passage score is measured at −12.282. The threshold is selected be tight enough to avoid selecting the passages for the completely irrelevant questions. It is observed that the thresholds of −10.0 or higher offers the correct answers when tuning the threshold between −15.0 and −0.5, as shown in FIG. 8. A catch-all threshold value of −10.5 is set to accept any passage that is above the catch-all threshold. The unanswerable question still remains outside all threshold and is rejected.

Figure 9:
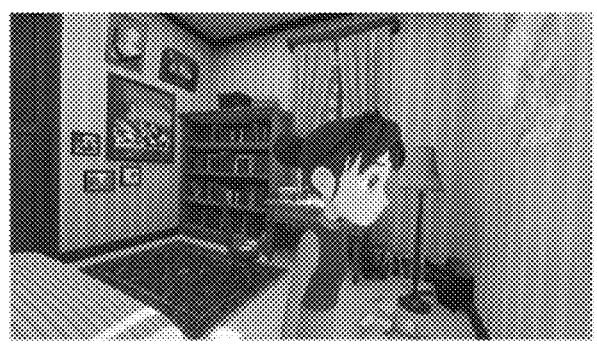
FIG. 9 illustrates exemplary tuning sizes of base scenes according to some embodiments of the present disclosure.

The impact of the size of the scene base is also examined with the 38 questions listed in Table 1. The size of the scene base varies from 2 to 5. The objective is to find a minimum size of the scene base that yields the correct answers. In one embodiment, the minimum size of the scene base is 3. When the scene base expands further outwards, no significant differences of the answers are observed in the future tense and the past tense questions, as there are a limited number of significant changes (e.g., Ella getting a book, a poisonous apple, and a magic pen), with one of these changes always occurring in at least one scene in the past or future. FIG. 9 illustrates the effect of a change in the size of the scene base. In this case, when the size of the scene base is set to 2, 4, and 5 for the question "What did Ella take?" the answers are incorrect because Ella will take the book, not the crown or the poisonous apple. So the optimal size of the scene base is 3.

A subjective test was conducted among 10 users on their experience with Context-QA. Two versions of Context-QA implementation were examined. One version is with all components in Context-QA enable and another version is only with the QA module enabled. The users were asked to use both versions in two separate tabs in a web browser. The users were instructed to stop at 0:16, 0:57, 1:49, 4:59, and 9:58. At each of these five scenes, the users asked the same pre-defined question "Where is Ella?" and three of their own questions. The users then reported which answer from the two versions they like better. At the end, the users were asked "Do you like the interactive experience?" and then were asked for a general feedback.

Figure 10:
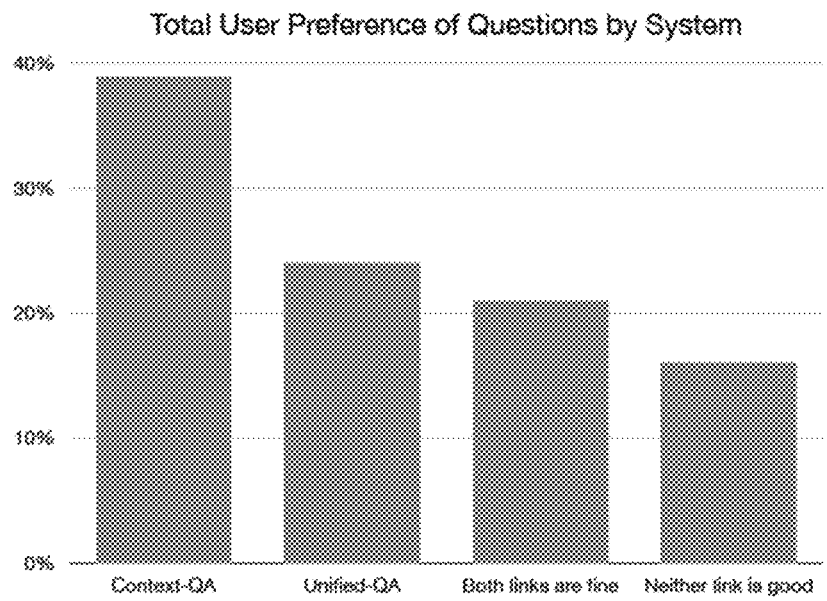
FIG. 10 illustrates exemplary user preferences of various QA systems according to some embodiments of the present disclosure.

As shown in FIG. 10, the users favor the answers provided by Context-QA. Context-QA outperforms UnifiedQA by 38%. The users think that both versions provide the acceptable answers for 21% answers. This is expected because both Context-QA and UnifiedQA provide non-context related answers in a similar manner. The users think that neither versions provide the acceptable answers for 16% answers. This illustrates that neither versions perform perfectly all the time and insufficient supplementary materials are also a contributing factor. Without the proper materials to inform the QA systems, the QA systems are at best only able to conclude that no answer is found and at worst are simply guessing.

Figure 11:
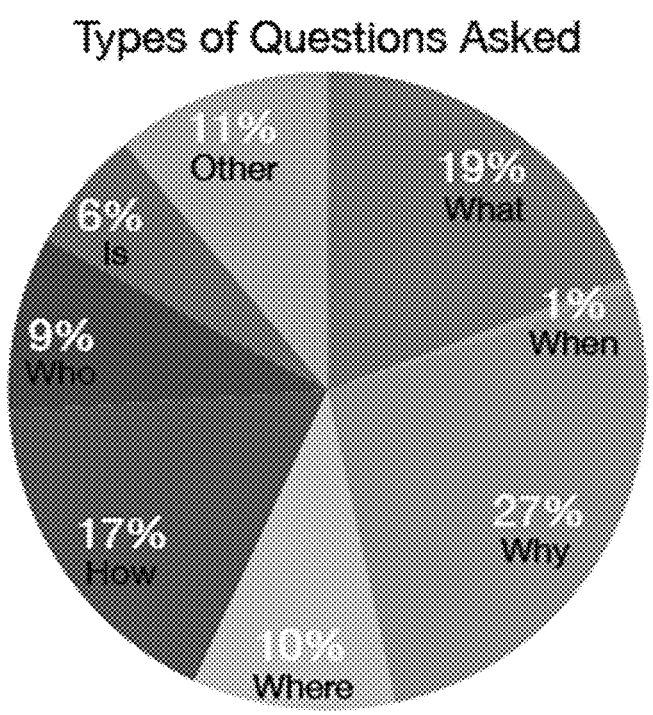
FIG. 11 illustrates exemplary types of questions asked by users according to some embodiments of the present disclosure.

The user like to ask their own questions. When given the chance, the users ask a variety of creative questions. FIG. 11 shows various types of questions asked by the users, sorted by the common who, what, when, where, and why categories. The users are not interested in asking questions about when the film takes place. Most questions are targeted at the why and what categories, where the users are seeking explanations for what they are watching. Some users attempt to test the QA systems with questions trying to get it to perform certain tasks. One user (P8) tries asking the QA systems to "Describe using 6 sentences Ella's relationship with Aunt Mary." Neither QA systems respond with an adequate answer according to the user.

Overall, 90% of the users enjoy this new form of interactive media, and one dissenting user does not give any specific reason for the opinion the user gives. The user like the freedom of asking questions at any point granted to them. One user (P3) states that "It is useful to answer questions during movie watching experiences" and another user (P1) likes the idea that the users could " . . . ask the questions freely."

Figure 12:
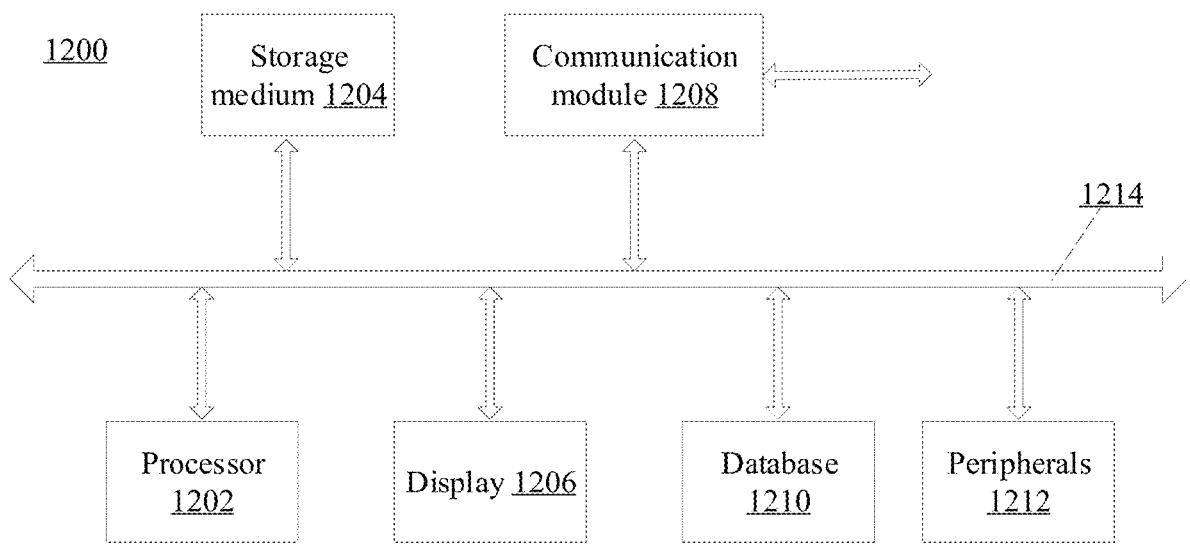
FIG. 12 illustrates a schematic structural diagram of an exemplary context-aware question answering device according to some embodiments of the present disclosure.

The present disclosure also provides a context-aware question answering device. FIG. 12 illustrates a schematic structural diagram of an exemplary context-aware question answering device according to some embodiments of the present disclosure. As shown in FIG. 12, the device 1200 may include a processor 1202, a storage medium 1204, a display 1206, a communication module 1208, a database 1210, and peripherals 1212, and one or more bus 1214 to couple the components together. Certain components may be omitted and other components may be included.

The processor 1202 may include any appropriate processor or processors. Further, the processor 1202 can include multiple cores for multi-thread or parallel processing. The processor 1202 may execute sequences of computer program instructions or program modules to perform various processes, such as receiving the question about the video that is paused; obtaining and analyzing context information at a pausing position of the video, the context information including supplementary materials of the video; searching an answer to the question based on the context information at the pausing position of the video; performing a language smoothing process on the answer; and outputting the language smoothed answer. The storage medium 1204 may include memory modules, such as ROM, RAM, flash memory modules, and erasable and rewritable memory, and mass storages, such as CD-ROM, U-disk, and hard disk, etc. The storage medium 1204 may store computer program instructions or program modules for implementing various processes, when executed by the processor 1202.

Further, the communication module 1208 may include network devices for establishing connections through a communication network. The database 1210 may include one or more databases for storing certain data (e.g., videos, supplementary materials) and for performing certain operations on the stored data, such as database searching and data retrieving.

The display 1206 may include any appropriate type of computer display device or electronic device display (e.g., CRT or LCD based devices, touch screens, LED display). The peripherals 1212 may include various sensors and other I/O devices, such as speaker, camera, motion sensors, keyboard, mouse, etc.

In operation, the computing device 1200 can perform a series of actions to implement the disclosed context-aware question answering method and framework. The computing device 1200 can implement a terminal or a server, or a combination of both. A terminal, as used herein, may refer to any appropriate user terminal with certain computing capabilities including, e.g., collecting user-entered directorial hints, displaying preview videos, performing editing optimization on a video. For example, a terminal can be a personal computer (PC), a workstation computer, a server computer, a hand-held computing device (tablet), a mobile terminal (a mobile phone or a smartphone), or any other user-side computing device. A server, as used herein, may refer to one or more server computers configured to provide certain server functionalities, such as determining camera configurations for shooting an animated video, generating the animated video based on the camera configurations, editing the animated video by finding a path with minimum cost function in a graph model. The server may also include one or more processors to execute computer programs in parallel. The terminal and/or the server may be configured to provide structures and functions for such actions and operations. In some embodiments, some part of the actions may be performed on the server, and other part of the actions may be performed on the terminal.

In some embodiments, the processor 1202 is further configured to: determine a scene base of the question; obtain supplementary materials of the video for the scene base; organize the supplementary materials into a plurality of passages; and rank relevancy of each of the plurality of passages with the question, the relevancy being a passage score.

In some embodiments, the processor 1202 is further configured to: analyze verbs of the question to determine a tense of the question; in response to the tense of the question being a past tense, determine the scene base to include a current scene and (N−1) scenes preceding the current scene, N being a size of the scene base for the question in the past tense or in a future tense; in response to the tense of the question being a present tense, determine the scene base to include the current scene; and in response to the tense of the question being the future tense, determine the scene base to include the current scene and (N−1) scenes succeeding the current scene.

In some embodiments, the processor 1202 is further configured to: organize the supplementary materials for each scene into three levels, where a first level includes a passage of a summary of each scene, a second level includes a passage of a screenplay of each scene, and a third level includes a passage of the closed caption of each scene or a passage of transcription of the audio track of each scene; and index a passage describing a character under a character name of the character. A passage describing multiple characters is indexed multiple times under each character name of the multiple characters.

In some embodiments, the processor 1202 is further configured to: use a document ranker to evaluate probability that a passage is related to the question to generate the passage score for each of the plurality of passages, where the passage score is a negative floating-point number.

In some embodiments, the processor 1202 is further configured to: search the plurality of passages for a passage matching the question based on the passage score; in response to the passage matching the question, generate the answer based on the passage matching the question; and in response to no passage matching the question, generate the answer to be a notification that no answer is found.

The present disclosure also provides a context-aware system for answering a question about a video. The system includes a terminal device and a cloud server. The terminal device is configured to: receive the question about the video that is paused; send the question to the cloud server; receive the answer from the cloud server; and output the answer. The cloud server configured to receive the question from the terminal device; obtain and analyze context information at a pausing position of the video, the context information including supplementary materials of the video; search the answer to the question based on the context information at the pausing position of the video; perform a language smoothing process on the answer; and send the language smoothed answer to the terminal device.

In some embodiments, the terminal device communicates with the cloud server through HTTP API.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A context-aware method for answering a question about a video, comprising:
   receiving the question about the video that is paused at a pausing position;
   obtaining and analyzing context information at the pausing position of the video, the context information including supplementary materials of the video; and
   automatically searching an answer to the question based on the context information at the pausing position of the video,
   wherein obtaining and analyzing the context information at the pausing position of the video includes:
      analyzing verbs of the question to determine a tense of the question;
      in response to the tense of the question being a past tense, determining a scene base of the question to include a current scene and (N-1) scenes preceding the current scene, N being a size of the scene base for the question in the past tense or in a future tense;
      in response to the tense of the question being a present tense, determining the scene base to include the current scene;
      in response to the tense of the question being the future tense, determining the scene base to include the current scene and (N-1) scenes succeeding the current scene; and
      obtaining and analyzing the supplementary materials of the video for the scene base according to the question.

2. The method according to claim 1, further comprising:
   performing a language smoothing process on the answer to obtain a language smoothed answer; and
   outputting the language smoothed answer.

3. The method according to claim 1, wherein analyzing the supplementary materials of the video for the scene base includes:
   organizing the supplementary materials into a plurality of passages; and
   ranking relevancy of each of the plurality of passages with the question, the relevancy being a passage score.

4. The method according to claim 1, wherein:
   N is an integer greater than 1; or
   N=3.

5. The method according to claim 3, wherein organizing the supplementary materials into the plurality of passages includes:
   organizing the supplementary materials for each scene into three levels, wherein a first level includes a passage of a summary of each scene, a second level includes a passage of a screenplay of each scene, and a third level includes a passage of closed caption of each scene or a passage of transcription of an audio track of each scene; and
   indexing a passage describing a character under a character name of the character, wherein a passage describing multiple characters is indexed multiple times under each character name of the multiple characters.

6. The method according to claim 3, wherein ranking relevancy of each of the plurality of passages with the question includes:
   using a document ranker to evaluate a probability that a passage is related to the question to generate the passage score for each of the plurality of passages, wherein the passage score is a negative floating-point number.

7. The method according to claim 1, wherein searching the answer to the question based on the context information at the pausing position of the video includes:
   searching the plurality of passages to find a passage matching the question based on the passage score;
   in response to finding a passage matching the question, generating the answer based on the passage matching the question; and
   in response to no passage matching the question being found, generating the answer to be a notification that no answer is found.

8. The method according to claim 7, wherein searching the plurality of passages to find the passage matching the question based on the passage score includes:
   performing a location search on the plurality of passages for the passage matching the question based on the passage score;
   in response to no passage matching the question being found in the location search, performing a character search on the plurality of passages for the passage matching the question based on the passage score; and in response to no passage matching the question being found in the character search, performing an iterative search on the plurality of passages for the passage matching the question based on the passage score.

9. The method according to claim 8, wherein:
a passage is determined to match the question when the passage score is greater than or equal to a preset threshold corresponding to a current search, the current search being one of the location search, the character search, and the iterative search; and
a passage is determined not to match the question when the passage score is smaller than the preset threshold corresponding to the current search.

10. The method according to claim 9, wherein:
the preset threshold for the location search and the character search is higher than the preset threshold for the iterative search.

11. The method according to claim 1, wherein:
the supplementary materials of the video include one or more of a starting timestamp and an ending timestamp of a scene, metadata of the scene, a screenplay of the video, a list of characters, closed caption of the video, and an audio track of the video.

12. The method according to claim 2, wherein performing the language smoothing process on the answer includes:
performing a grammar error correction process on the answer to obtain the language smoothed answer.

13. A context-aware device for answer a question about a video, comprising:
a memory storing program instructions; and
a processor coupled with the memory and configured to execute the program instructions to:
receive the question about the video that is paused at a pausing position;
obtain and analyze context information at the pausing position of the video, the context information including supplementary materials of the video; and
automatically search an answer to the question based on the context information at the pausing position of the video,
wherein obtaining and analyzing the context information at the pausing position of the video includes:
analyzing verbs of the question to determine a tense of the question;
in response to the tense of the question being a past tense, determining a scene base of the question to include a current scene and (N−1) scenes preceding the current scene, N being a size of the scene base for the question in the past tense or in a future tense;
in response to the tense of the question being a present tense, determining the scene base to include the current scene;
in response to the tense of the question being the future tense, determining the scene base to include the current scene and (N−1) scenes succeeding the current scene; and
obtaining and analyzing the supplementary materials of the video for the scene base according to the question.

14. The device according to claim 13, wherein the processor is further configured to:
perform a language smoothing process on the answer to obtain a language smoothed answer; and
output the language smoothed answer.

15. The device according to claim 12, wherein the processor is further configured to:
organize the supplementary materials into a plurality of passages; and
rank relevancy of each of the plurality of passages with the question, the relevancy being a passage score.

16. The device according to claim 15, wherein the processor is further configured to:
organize the supplementary materials for each scene into three levels, wherein a first level includes a passage of a summary of each scene, a second level includes a passage of a screenplay of each scene, and a third level includes a passage of the closed caption of each scene or a passage of transcription of the audio track of each scene; and
index a passage describing each character by a character name.

17. A context-aware system for answering a question about a video, comprising:
a terminal device configured to:
receive the question about the video that is paused at a pausing position;
send the question to a cloud server;
receive a language smoothed answer from the cloud server; and
output the answer; and
the cloud server configured to
receive the question from the terminal device;
obtain and analyze context information at the pausing position of the video, the context information including supplementary materials of the video;
automatically search the answer to the question based on the context information at the pausing position of the video;
perform a language smoothing process on the answer to obtain the language smoothed answer; and
send the language smoothed answer to the terminal device,
wherein obtaining and analyzing the context information at the pausing position of the video includes:
analyzing verbs of the question to determine a tense of the question;
in response to the tense of the question being a past tense, determining a scene base of the question to include a current scene and (N−1) scenes preceding the current scene, N being a size of the scene base for the question in the past tense or in a future tense;
in response to the tense of the question being a present tense, determining the scene base to include the current scene;
in response to the tense of the question being the future tense, determining the scene base to include the current scene and (N−1) scenes succeeding the current scene; and
obtaining and analyzing the supplementary materials of the video for the scene base according to the question.

18. The system according to claim 17, wherein:
the terminal device communicates with the cloud server through HTTP API.

* * * * *